Jan. 7, 1936.  E. C. LONG  2,026,789
PISTON FOR INTERNAL COMBUSTION MOTORS
Filed Sept. 9, 1932
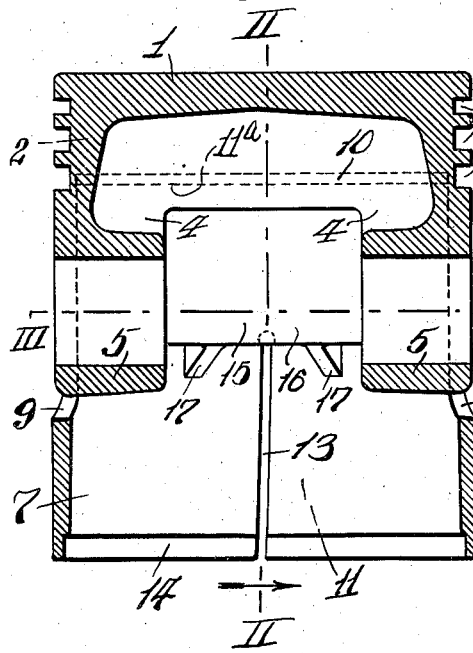
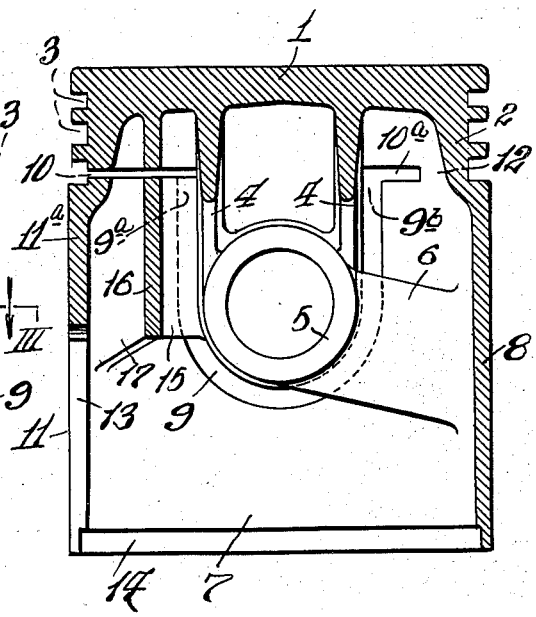
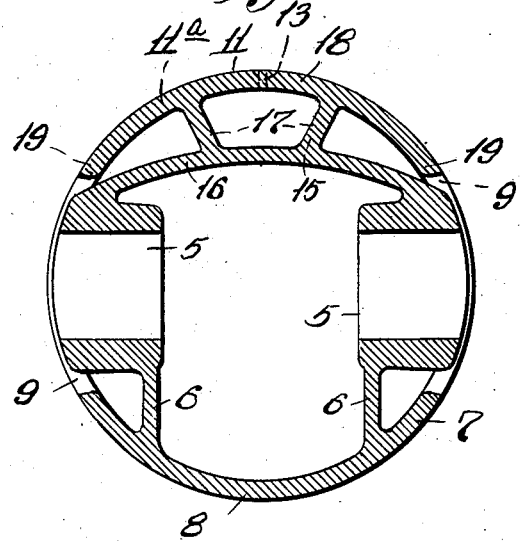
Inventor:
Elmer C. Long.
By Herbert G. Fletcher
atty.

Patented Jan. 7, 1936

2,026,789

UNITED STATES PATENT OFFICE 2,026,789

PISTON FOR INTERNAL COMBUSTION MOTORS

Elmer C. Long, Grosse Pointe Park, Mich.

Application September 9, 1932, Serial No. 632,326

3 Claims. (Cl. 309—11)

This invention relates to improvements in pistons and is a furthering of the improvements disclosed in my pending application Serial Number 625,586 filed July 29, 1932, this application however differing from said pending application in that the piston skirt has no separated section or slipper.

The primary object of this invention is to provide a piston having a skirt which is approximately continuous in its circumference, the skirt being flexible on one side and capable of bodily movement relative to the remainder of the piston.

Another object of the invention is in providing a piston having a full skirt which is slotted in a manner to provide a flexible thrust side and with means on the flexible side of the piston which is effective thereon when the piston is under the influence of heat.

A further object of the invention is in providing a piston with an approximate full skirt having an improved rigid construction on the power thrust side and a flexible structure on the compression thrust side of the skirt.

Other and further objects will appear in the specification and be specifically pointed out in the appended claims, reference being had to the accompanying drawing, exemplifying the invention, and in which:—

Figure 1 is a longitudinal vertical section taken through the pin boss sides of this improved piston.

Figure 2 is a longitudinal vertical section taken approximately on the line II—II of Fig. 1.

Figure 3 is a horizontal section taken approximately on the line III—III of Fig. 1.

The accompanying drawing discloses a piston having a head 1 and a side wall 2 depending from the head having packing ring grooves 3 formed therein and depending from opposing sides of the side wall 2 are pairs of legs 4 for the support of pin bosses 5. The legs 4 at their upper ends join with the head and with each other.

Extending from one side of each pin boss is a web 6, said webs at their extending ends joining with the skirt 7 on the power thrust side 8 of the skirt, the pin bosses 5 each being free from engagement with the skirt by the gap or slot 9 on each pin boss side of the skirt, each of said gaps 9 encompassing the underside of respective pin bosses and the supporting legs 4.

The head 1 of the piston is partially separated from the skirt 7 by the transverse slot 10 which is joined at its ends with the upper ends 9a of respective slots 9 on the compression thrust side 11 of the skirt and in alinement with said transverse slot 10 on the power thrust side 8 adjacent each pin boss, is a transverse slotting 10a with which the ends 9b of the slots 9 are connected.

The transverse slots 10a on each pin boss side of the skirt are relatively short in length as shown in Fig. 2 thereby leaving an intermediately disposed portion 12 with which the power thrust side 8 of the skirt is connected to the side wall 2 of the piston head 1, the direct connection of the power thrust side 8 with the head through the intermediate portion 12, being capable of presenting a solid thrust side to the cylinder wall particularly by the reinforcement of the web 6 from respective pin bosses 5 to the power thrust side 8.

The compression thrust side 11 of the skirt is provided with a longitudinal slot 13 which extends from the open end 14 of the skirt to adjacent a horizontal plane through the pin boss axis as shown in Figs. 1 and 2, the longitudinal slot 13 being for the purpose of providing flexibility to the approximate lower half of the compression thrust side 11.

The approximate upper half portion of the compression thrust side 11 which is in the form of a tongue-shaped portion 11a by reason of the slottings 9 and 10, is provided with a bridge structure 15 comprising an arcuate vertical wall or web 16 which is connected at its ends to the outer end of respective pin bosses 5 as shown more clearly in Fig. 3, and formed integral with said wall 16 are a pair of diverging webs 17 which join the central portion of the compression thrust side 11 of the skirt.

The wall 16 and the inclined web 17 in the casting operation of the piston are extended to the head 1, and in the machining, the cutting operation required for making the slot or gap 10 will sever the arcuate wall 16 and the joining web 17 from the head.

The slotting of the compression thrust side 11 of the skirt and the bridge structure 15 thereof, provides a flexible thrust side which is resiliently yieldable and in the machining and finishing of the piston, the skirt may be provided with a relative small clearance such as .002 of an inch for fitting the piston in the cylinder of an internal combustion motor, as in a piston of this improved character, a clearance of approximately .002 is sufficient to prevent back-slap of the piston in the cylinder during the starting of the motor or when the motor is running cold. Upon heated conditions occurring within the cylinder, the head 1 by reason of receiving expanding burning thrusts from gaseous charges will obviously receive the maximum of heat and consequently a maximum of expansion. As the head expands, the opposing pin bosses 5 which are connected to respective ends of the arcuate wall 16, will be moved outwardly by the expansion of the head across the pin boss diameter and the arcuate wall 16 by reason of the separating forces of the pin bosses, will tend to straighten or lengthen the wall 16 and in so doing will tend to pull or hold the tongue-shaped 11a or upper half portion of the compression thrust side 11 inwardly and whereas the longitudinal slot 13 by reason of weakening the lower portion of the thrust side 11 will obviously permit inward movement for flexing of the lower portion of the thrust side 11.

It is therefore seen that when the piston is in operation in its cylinder, the compression thrust side 11 by reason of it being flexible and resiliently yieldable, is capable of a limited bodily movement towards or away from the center of the piston, due to its flexible connection with the pin bosses, during changing thermal conditions of the piston and cylinder.

From the above description of this improved piston, it is obvious that a solid or rigid structure is provided on the power thrust side 8 of the piston for receiving the angular power thrusts of the connecting rod of the piston and whereas any take-up required due to expansion of the piston, will be compensated for by the resiliently yieldable flexible compression thrust side 11 of the skirt and at the same time, a full or solid wall skirt is provided.

Having thus described the invention so that those skilled in the art will be able to practice the same, what I desire to secure by Letters Patent is defined in what is claimed, it being understood that various changes in the device shown and described above in detail and not amounting to invention, may be made without departing from the spirit and scope of my invention.

What I claim is:—

1. A piston having a head, a skirt, pin bosses separated from the skirt, said skirt being separated from the head except on one of its thrust sides, and a transversely disposed member connected at its ends to one side of respective pin bosses and having connection with the other thrust side of said skirt, said last mentioned thrust side being longitudinally slotted, and the skirt being circumferentially continuous from the slot for providing an approximate full cylinder bearing skirt.

2. A piston having a head, a skirt, pin bosses separated from the skirt, said skirt being separated from the head except on one of its thrust sides, and a transverse arcuate member connected at its ends to the outer ends of respective pin bosses, said transverse member having intermediately disposed diverging webs connecting the other thrust side of the skirt, said skirt having a longitudinal slot on one of its thrust sides and being circumferentially continuous from the slot.

3. A piston having a head, a skirt, pin bosses separated from the skirt, the skirt beneath the pin bosses being circumferentially continuous, said skirt being separated from the head except on one of its thrust sides, said skirt on its opposite thrust side having an intermediately slotted tongue-shaped portion extending towards the head, and a transverse arcuate member connected at its ends to respective pin bosses and having intermediate connection with said tongue-shaped portion.

ELMER C. LONG.